Figure 1:
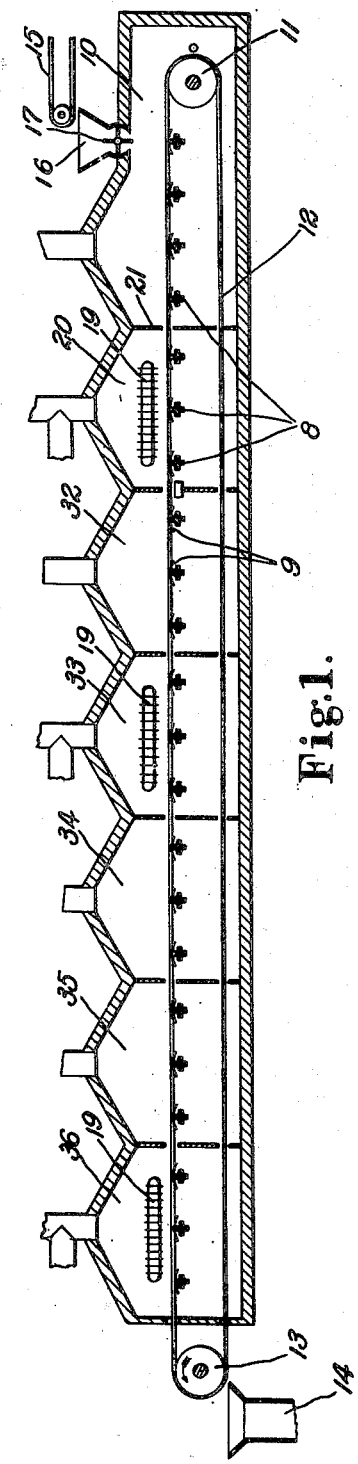

Sept. 26, 1950

C. BIRDSEYE 2,523,552

DEHYDRATION OF FOOD PRODUCTS

Filed Feb. 16, 1946

3 Sheets-Sheet 1

INVENTOR
Clarence Birdseye
BY
Hemway & Witter
Attys.

Patented Sept. 26, 1950

2,523,552

UNITED STATES PATENT OFFICE 2,523,552

DEHYDRATION OF FOOD PRODUCTS

Clarence Birdseye, Gloucester, Mass., assignor to Dehydration, Inc., Gloucester, Mass., a corporation of Massachusetts Application February 16, 1946, Serial No. 648,043

27 Claims. (Cl. 99—199)

This invention relates to the dehydration of food products and in its most important aspect comprises a novel process of producing dehydated cooked potatoes in granular form capable of being rapidly rehydrated into mashed potato by the addition of hot water and stirring.

My invention solves a problem that has baffled the industry for a great many years. No satisfactory potato product of this kind has heretofore been available, although the vegetable dehydrating industry of the United States was tremendously expanded at the insistence of the armed forces and many millions of pounds of dehydrated white potatoes were manufactured at plants located in the northern tier of States during the years 1942-1945. Yet these dehydrated potatoes were for several reasons not of satisfactory quality. Reconstitution time varied from approximately half an hour for the riced product to several hours for dice and julienne strips. The texture of the reconstituted product was pasty, its aroma unnatural, and its flavor very poor indeed. Production costs were high because of the prolonged processing time. Expensive equipment occupying an excessive amount of floor space was required, and a great deal of hand labor. The vitamin content, particularly the B-complex, was very low in the finished product. Further serious handicap in the production of dehydrated potatoes has been that only a few varieties of potatoes having a high starch and a low sugar content could be used at all, so that it has been sometimes necessary to ship raw material many hundreds of miles to dehydrating plants when the local potatoes were unsatisfactory. The relatively poor quality of dehydrated potatoes produced by prior commercial methods is demonstrated by the fact that today, less than six months after the defeat of Japan, 75% of all wartime potato dehydrating plants in the United States have been closed and only an insignificant quantity of potatoes is now being dehydrated.

I have discovered some of the reasons why processes heretofore known have failed to produce satisfactory potato products. The potato structurally is a thickened stem with an outer skin which is usually removed as inedible. The framework of the potato is made up of cellulose which forms the walls of a network of cells constituting the body of the tuber. These cells vary in size and shape and in them lie the starch grain. When potatoes are cooked they soften; the starch grains within the cells increase in bulk due to hydration, and as the cooking is prolonged the cell walls tend to break and the potato becomes sticky.

The housewife in making mashed potato cooks to the desired tenderness and then proceeds to mash while hot with a kitchen masher until the potato mash is creamed or beaten to the desired state of fluffiness.

In making my dehydrated potato product, I avoid mashing the potatoes immediately after they are cooked tender. Throughout my entire process I seek to preserve practically intact the integrity of the cooked starch grains and cellulose structure, the breakdown of which results in a dehydrated product which produces an undesirable mashed potato on rehydration.

Cooked pieces of white potatoes from which little or no moisture has been removed are so sticky that they cannot be satisfactorily stirred during dehydration. They are, therefore, very slow to dry, and when dry they invariably adhere into aggregated masses. I have found that this stickiness grows less pronounced as the moisture content of potatoes is reduced, but remains formidable up to the time that the product is so dry that it cannot be satisfactorily riced or extruded—a point that is reached after from 55% to 80% of the original moisture content has been removed.

I have discovered that shreds of cooked potato, even if properly dried so that when rehydrated they produced a good mashed potato, will not yield a satisfactory product if they are ground or pulverized. The grinding causes a breakdown in the starch grains and in the cell walls and results in a pasty gelatinous texture on rehydration instead of the fluffy mashed potato which results from the same shreds rehydrated before being ground. Accordingly, in my process I avoid any grinding or crushing of the cooked product and instead extrude the cooked potato through a wire mesh screen which breaks up the potato tissue without unduly fracturing either the cell walls or the starch grains.

Cooked unfrozen white potatoes become progressively stickier with repeated ricings or extrusions and should not be riced more than twice. If too great pressure is exerted on the potato at the time it is riced, many of the starch grains are broken and the rehydrated product is exceedingly pasty. Accordingly, an important characteristic of the process of my invention is that in each step the starch grains of the potato are carefully preserved against damage.

I have further discovered that sticking together of cooked pieces of potato may be avoided by a preliminary dehydration step, that is to say, if 10 to 45% of the original moisture is removed prior to the cooking step, the product may be thereafter handled in a condition of discrete pieces without the formation of aggregated masses. To this end I cut the raw potatoes into small pieces and maintain these individual pieces as such throughout the preliminary steps of the process and until they have been partially dried, cooked, frozen and thawed.

The process of my invention comprises a novel sequence of co-related steps, all contributing to the rapid production of dehydrated potato in granular form in which the integrity of the individual starch grains is maintained and by which many other advantages in respect to aroma, flavor and nutritive value are realized. Extreme speed is the essence of my novel process. This speed is possible because the raw potatoes are first cut into small pieces before being processed, because each separate piece in the mass of product is forcibly danced throughout the process and kept from adhering to any other piece, and because as a result of dancing all the surface of every piece is continuously exposed to the several heat exchange media employed during the process.

My process has the further advantage that it facilitates the addition to the potato product of dry ingredients such, for example, as salt and dehydrated skim milk. As herein shown, I propose to sift such dry ingredients upon the moving layer of diced potato and to distribute it through the mass by passing the mixture under a mixing tedder. The mixture of potato dice and dry ingredients immediately passes to the first extruding station where it is pressed through the wire mesh and transformed into shreds whose length is dependent upon the thickness of the product layer before extrusion. The product may be subjected to two or more extrusion steps which mix the ingredients thoroughly and break up the vegetable tissue without damage to the starch grains themselves.

Another important characteristic of the process of my invention consists in a freezing step which is effected preferably after the product has been partially dehydrated and thoroughly cooked. I have discovered that a freezing step is very beneficial in separating the moisture content from the cell structure and in freeing the moisture which, up to that time, is bound in hydrated form with the starch or with the colloids of the vegetable cells. By freezing and then thawing the potato product at the proper stage in the cycle of my improved process, I am able to free from the cell tissue moisture which is bound with the tissue colloids and therefore otherwise difficult to remove.

Figure 2:
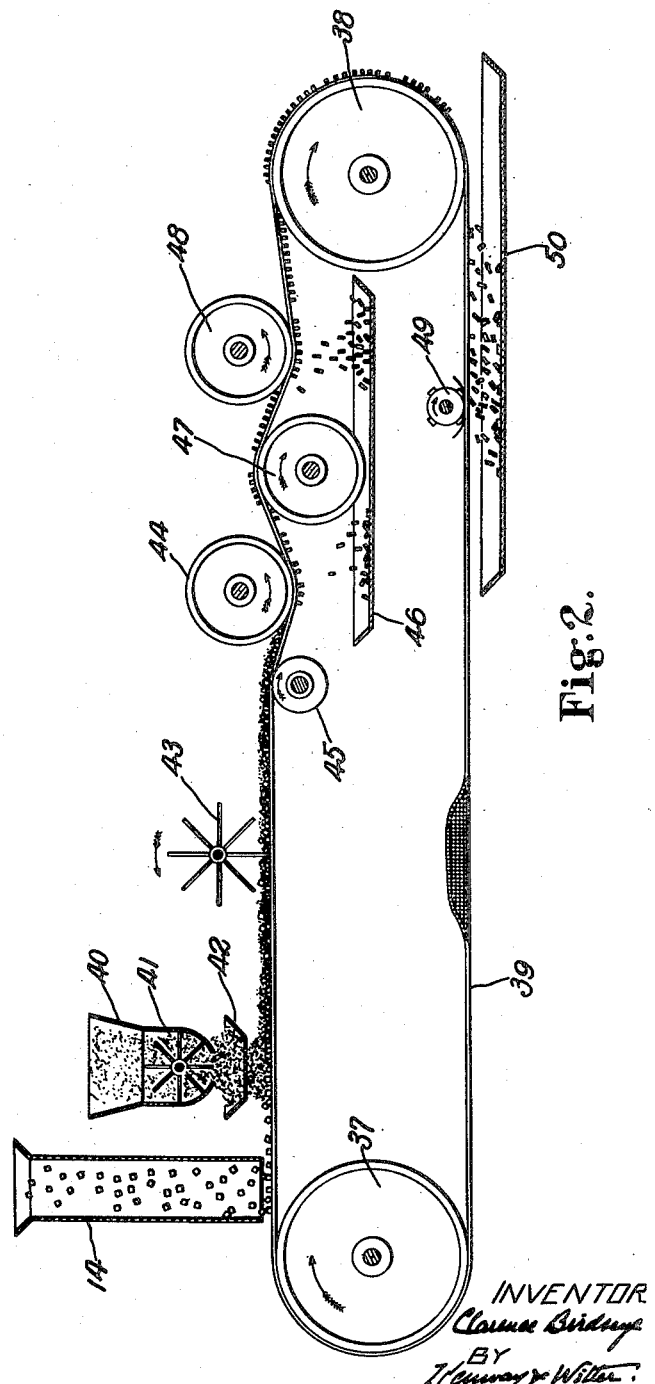
Figure 3:
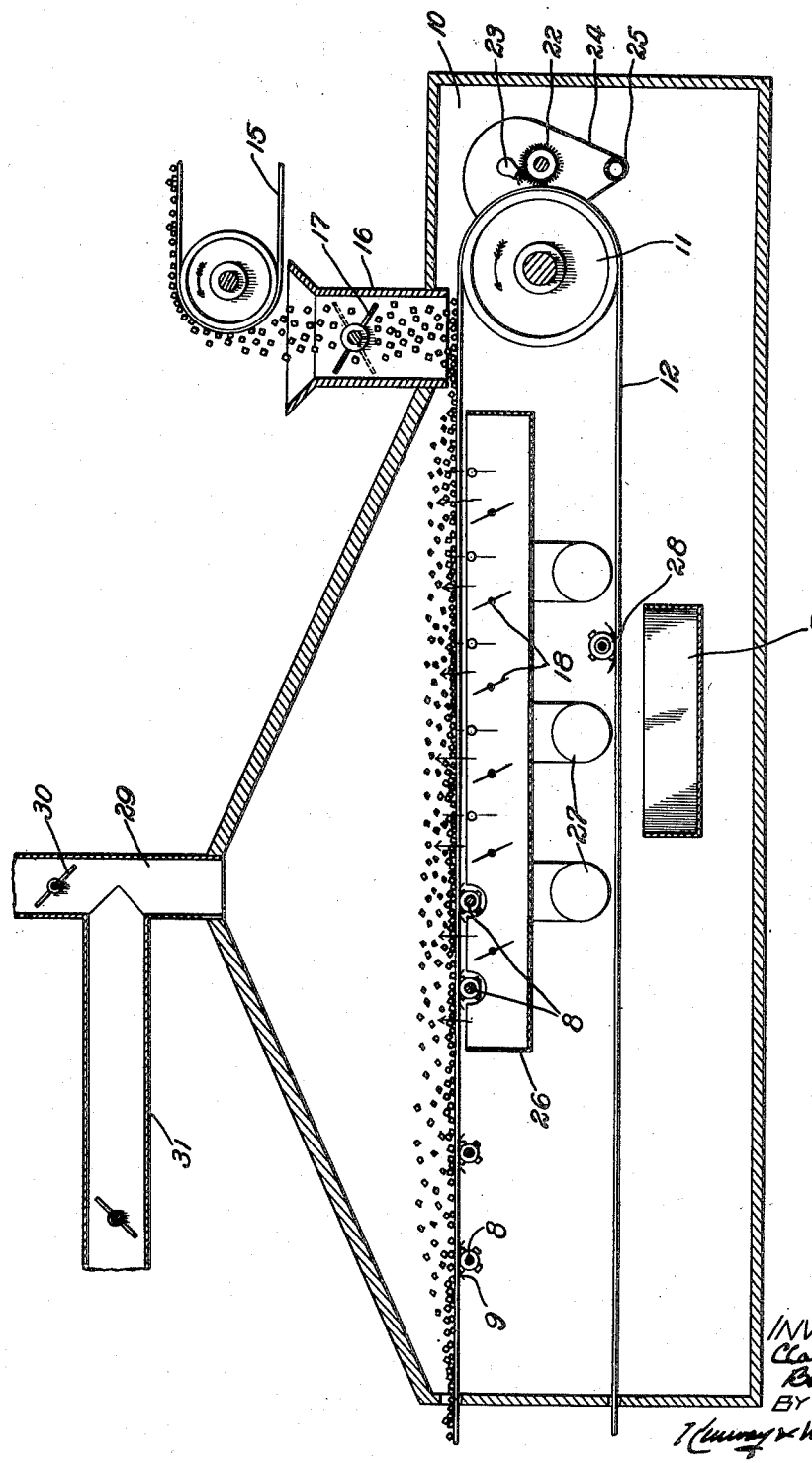
Figure 4:
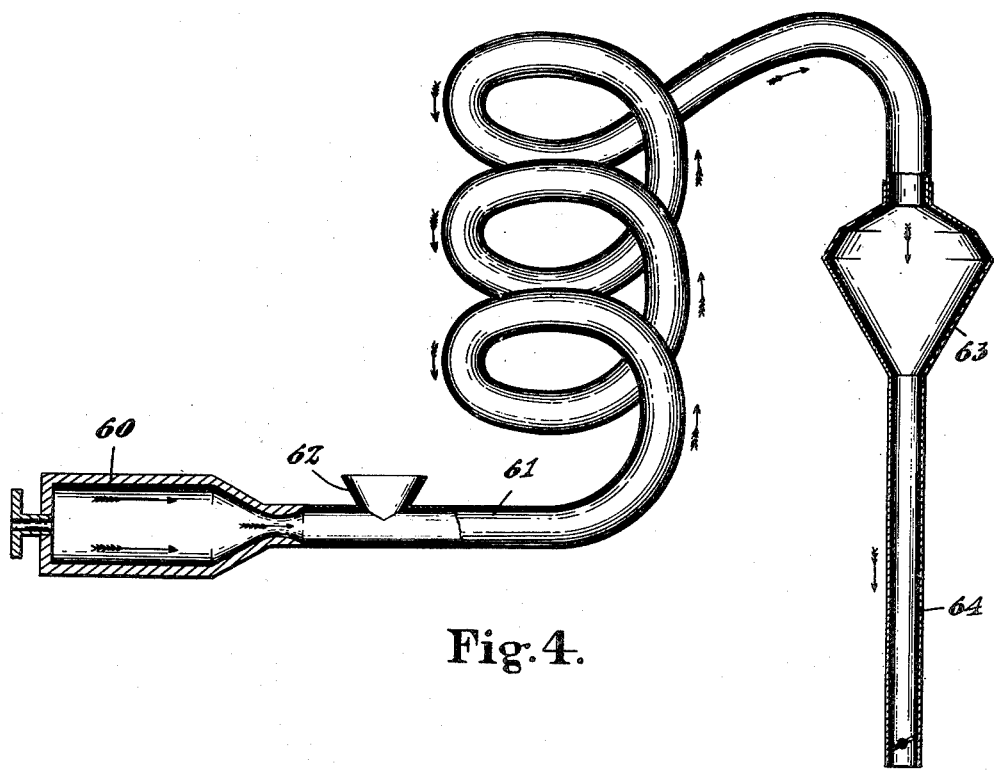

The process of my invention in one aspect comprises the steps of dicing raw white potato, blanching, preliminary drying, cooking, further drying, freezing, thawing, adding dry ingredients, mixing, extruding in several steps, and then final drying operation. These steps are all performed in rapid succession, and as already noted the product is continuously danced while being subjected to all of the heat exchange steps. Under certain conditions the blanching step may be omitted, the order of the steps may be varied, and their intensity or severity adjusted, but for purposes of illustration the process in the best form now known to me will be described in connection with the accompanying drawings which show diagrammatically one suitable form of apparatus and in which:

Fig. 1 is a view in longitudinal section of apparatus for carrying out the heat exchange steps of the process, Fig. 2 is a view in elevation, partly in longitudinal section, showing apparatus suitable for the mixing and extruding steps of the process, Fig. 3 is a view in longitudinal section and on an enlarged scale illustrating the first heat interchange step of the process, and Fig. 4 is a view in elevation, partly in section, of apparatus suitable for the final dehydrating step.

As shown in Figs. 1 and 3, the various heat interchange steps of the process may be carried out in a series of adjacent compartments having heat insulating walls through which the product is conveyed progressively by an endless conveyor. In the first compartment 10 of the series is mounted a pulley 11 over which passes an endless conveyor 12 which is preferably of wire screen mesh or other foraminous material. At the other end of the series is located a pulley 13 over which the conveyor passes and this is arranged in cooperative relation to a discharge hopper 14. Raw potato in dice form is supplied to the right-hand end of the conveyor belt 12 by a feed belt 15 which delivers the product to an inlet hopper 16 provided with a controlling valve or gate 17. The product delivered by the feed belt 15 is prepared by peeling and trimming raw potatoes and then cutting them into dice preferably $1/8''$ x $1/4''$ x $1/4''$ in dimension, thus having a high surface to weight ratio.

The product is subjected in compartment 10 to a blanching step which may be effected by subjecting the potato dice to saturated steam at atmospheric pressure for about 45 seconds. This treatment is effective to inactivate the enzyme content of the potato dice and prevent subsequent discoloration of the product.

The blanching step is desirable but not essential in the process of my invention. For it may be substituted by a bisulfiting step. After emerging from the cutting machine the dice may be showered with a 25% aqueous solution of sodium bisulfite or other equivalent antioxidant that is effective to prevent discoloration of the product until the enzyme content is inactivated by the cooking, after which there is no tendency toward discoloration.

The conveyor which carries the dice through the blanching and subsequent steps up to extrusion is constantly subjected to violent vertical vibrations together with its slow advancing movement. It may, if desired, be tilted downwardly toward the discharge end of the apparatus, although for convenience it is diagrammatically shown in the accompanying drawings as operating in a substantially horizontal path. These combined characteristics of the conveyor 12 cause the individual dice of the product mass to impinge upon the conveyor and thus to dance violently throughout their controlled progress. Because the units of the mass are thus constantly danced or bounced about in a predominantly vertical direction, the mass of the product is readily permeable by currents of hot or cold gases. In carrying out my process, those gases preferably pass upwardly through the conveyor and through the product mass at considerable velocity but not sufficiently rapidly to cause the product units to dance without the aid of mechanical vibration of the belt. Vibration is imparted to the belt by a series of transverse shafts 8 provided with longitudinal ribs and arranged at suitable intervals along the length of the apparatus under and in contact with the conveyor 12. Between each shaft and the conveyor is interposed a thin sheet metal shield 9. The shafts 8 are driven at suitable speed and act through the shields 9 to vibrate the conveyor continuously as it passes through each of the successive compartments.

The compartment 10 is separated from the next adjacent compartment 20 by a partition 21 having horizontal slots permitting passage of the conveyor with its layer of potato dice and for the return of the unloaded conveyor. The shafts 8 or knockers, as they will be herein termed, are so arranged that minimum vibration is imparted to the conveyor where it passes through the partitions between adjacent compartments.

Fig. 3 shows the receiving compartment 10 and the apparatus therein in somewhat greater detail than Fig. 1. The returning conveyor 12, in passing about the pulley 11, is subjected to the cleaning action of a rotary brush 22 and a hot water spray delivered by a nozzle 23 located just above the brush 22. The brush and nozzle are enclosed in a casing 24 having a drain 25 suitably located to discharge the debris removed from the conveyor in the cleaning operation. The result of this arrangement is that the conveyor arrives beneath the supply hopper 16 in clean condition to receive the fresh product to be processed.

After receiving its layer of diced potato from the hopper 16, the conveyor passes over a manifold 26 which is supplied by ducts 27 with saturated steam at atmospheric pressure which at least partially inactivates the enzyme content of the potato dice in about 45 seconds. If the blanching step is omitted the apparatus of this compartment may be utilized for a preliminary partial dehydration of the product.

The conveyor which carries the dice through this and subsequent steps is constantly subjected to violent vertical vibration by the knockers 8. Beneath the return run of the conveyor belt 12 is shown a scrap receiver 7, and where the belt passes over this it is acted upon by a knocker 28 which tends to remove all loose scraps from the belt, causing them to fall into the scrap receiver 7. The compartment 10 is herein shown as provided with an outlet stack 29 having a controlling valve or damper 30 and a recirculating branch 31. A series of adjustable vanes or louvres 18 is arranged in the manifold 26 for the purpose of directing steam or other gas through the product layer at a forwardly inclined angle best suited to the product in process.

The blanched potato dice are now conveyed into the second compartment 20 where they are subjected to the first partial dehydration step of the process. For that purpose they are subjected to superheated steam at atmospheric pressure and a temperature of approximately 500° F. and also to radiant heat from a steam coil 19 or the like located above and parallel to the conveyor. This steam treatment removes in about one minute preferably from 25% to 35% of the original moisture of the raw potato. This preliminary drying has three principal objectives: (1) to render the individual dice sufficiently firm so that they will not be crushed or abraded during the subsequent steps of the process; (2) to reduce the amount of water which must be heated when the product is cooked; (3) to make the dice less sticky during the cooking and subsequent steps. In this step it is important not to remove more than about 45% of the original moisture content of the product, for if a greater amount of moisture is removed at this time, an objectionable tendency to case harden or form a dry skin on the individual dice is noted. On the other hand, the removal at this step of as much as 24 lbs. of water for every 100 lbs. of raw potato greatly facilitates subsequent drying steps.

Upon leaving the compartment 20 the partially dried potato dice are now advanced into the cooking compartment 32 where they are completely cooked by being subjected to saturated steam for about 4 minutes. In this step the peroxidase content of the potato dice is thoroughly inactivated even if the blanching step has been omitted. It should be noted that there is no appreciable change of weight in the potato dice during the cooking step. They do not take on any substantial amount of moisture as might naturally be expected. I have found also that it is necessary to have present in the product for the cooking step at least half of the original moisture content in order to cook and hydrate the starch properly. The cooking step not only cooks the potato tissue but hydrates the starch thus making it edible, and also brings about an equalizing redistribution of the moisture content within the dice. By this cooking step the potato tissue is also rendered tender to the degree desired by the consumer.

From the cooking compartment the partially dehydrated and cooked potato dice progress into the compartment 33 where they are treated to a second dehydrating step by being subjected to radiant heat from a steam coil 19 and to a recirculating current of hot dehydrating air or gas. In this step another 25% to 35% of the original moisture content is removed by subjecting the dice to superheated steam at approximately 400° F. for about one minute. The exact amount of moisture removed in each of the two drying steps will vary according to operating conditions and the nature of the raw material. A satisfactory working range would effect the removal of 10% to 45% of the original moisture content in the first dehydration step, 10% to 45% in the second dehydration step, and from 35% to 80% in both steps, that is to say, reducing the moisture to 65-20% of its initial content. This rather wide range is necessary in view of the fact that the original moisture content of potatoes varies very widely as does also the original sugar and starch contents. Moreover, the range suggested permits the addition of dry ingredients to the product in subsequent steps of the process while still maintaining sufficient moisture content to insure proper behavior of the product in the ricing step.

After leaving the second drying compartment 33, the potato dice pass into a pre-cooling compartment 34 where their temperature is lowered by means of cool gas from about 180° F. to about 95° F. in approximately 30 seconds. This pre-cooling step permits the subsequent freezing step to be carried out at less cost than if a hot product were to be directly treated, and also somewhat further reduces the moisture content, perhaps by 4 or 5%.

The pre-cooled partially dehydrated potato dice are now advanced into a freezing compartment 35 where their temperature is reduced to about 20° F. in about 1 minute by a blast of air or other gas refrigerated to about —20° F. Because of the large temperature differential between the product and the air in this compartment, considerable moisture, probably as much as 2% of the original moisture content, is removed from the product during this step and deposited upon the cooling coils of the refrigerating system. One important reason for subjecting the product to a freezing step is that in this way the chemical bond between the water and starch of the product is loosened. The step is also important as improving the mealy texture of the finished product and in expediting the further dehydration of the product after it has been riced.

The frozen potato dice are next advanced to a thawing compartment 36 where the frozen dice are thawed and raised to a temperature of about 70° F. in from 15 to 30 seconds by being subjected to air or other gas maintained at approximately 200° F. When this thawing step is initiated, moisture is deposited from the hot air upon the cold potato dice, and since the dice thereby act as desiccants, the moisture content of the recirculated air in the thawing compartment is quickly lowered to the point where there is no substantial change in the weight of the dice entering the compartment. The thawing step is necessary in order to get the potato dice in condition for ricing since it is undesirable to rice them in frozen condition. The thawed product, moreover, is in optimum condition to take on added dry ingredients. I prefer to recirculate and reheat the air used in the thawing compartment so that with the frozen dice acting as a desiccant, the air and dice come to a condition of equilibrium such that the dice pass through this step without any substantial change in their moisture content.

In this thawing process I can raise the temperature of the pieces to the degree best suited for extruding and also for incorporation of dry ingredients. By extruding at temperatures much below those usually employed in riced potatoes I minimize the danger of breaking down the starch grains because high temperature as well as severe mechanical pressure is injurious to the integrity of both the starch grains and the cell walls.

The process of my invention has been described as carried out in a succession of separate compartments 10, 20, 32, 33, 34, 35 and 36. It will be understood that this representation is diagrammatic only and that the dimensions and shape of the various compartments may be widely varied in accordance with the steps to be carried out therein. Moreover, the several steps may be carried out in compartments each of which forms a separate apparatus.

The thawed and partially dehydrated product is discharged by the belt 12 to the hopper 14 and from it carried to the apparatus shown in Fig. 2 of the drawings. This unit includes pulleys 37 and 38 over which runs a wire mesh conveyor belt 39 in the direction of the arrows. The potato dice are delivered to the belt 39 adjacent to the pulley 37 and are advanced by the belt in a layer of controlled thickness. Adjacent to the hopper 14 is provided a second hopper 40 having a rotary valve 41 and arranged to discharge through a sieve 42 upon a layer of potato dice being advanced by the belt 39. Any desired dry edible ingredients may be supplied by the hopper 40 such, for example, as salt or dehydrated skim milk. This is sifted upon the moving layer of dice and is mixed through the mass by being passed under a tedder 43 located in operative relation to the belt 39 beyond the hopper 40.

The mixture of dice and dry ingredients now passes under the first extruding roll 44 by which it is pressed downwardly through the wire mesh of the belt and converted into shreds whose length is dependent upon the thickness of the product layer on the belt. The belt is shown as passing over a supporting roller 45 as it approaches the extruding roll 44. After the first extruding step some of the potato shreds will drop from the belt 39 into a vibrating conveyor pan 46 supported in position beneath the roll 44, but most of the product will stick to the belt and be carried to a second extruding roll 47 by which all the product adhering beneath the belt will be extruded upwardly. Continued movement of the belt now brings the product to a third extrusion roll 48 by which it is again extruded downwardly through the mesh of the belt 39 and at this point many of the shreds will drop from the belt into the conveyor pan 46. Finally the pulley 38 at the end of the apparatus forces the remaining potato shreds upwardly and outwardly through the belt 39 from the return run of which they are removed by a knocker 49 which is arranged to engage the belt in a location above the pan 50.

A small amount of the potato shred adheres to the meshes and to the underside of the belt 39 and thus is returned to the receiving end of the apparatus where it is re-extruded and mixed with additional product. It is important to note that each extrusion step mixes the ingredients more thoroughly and breaks up the vegetable tissue without fracturing the starch grains themselves. It is important also that the potato granules removed from the unit of Fig. 2 shall have a residual moisture content of not more than 60%, for otherwise they will not remain discreet and unbroken in the final drying step; nor less than 40% for otherwise they cannot be readily riced.

The final drying step may be accomplished in any one of several ways, but I prefer to pass the potato granules directly from the pan conveyors shown in Fig. 2 into a hot blast tunnel and thence into a cyclone separator. Such apparatus is diagrammatically illustrated in Fig. 4 where a combustion chamber 60 is shown as connected to a spiral duct 61 having an inlet hopper 62 and discharging to a cyclone separator 63. Air or gas is delivered to the duct 61 having a relative humidity of 25% or less and a temperature in the neighborhood of 300° F. The potato granules are delivered continuously from the conveyor pans 46 and 50 to the inlet hopper 62 of the duct 61. The potato granules are carried through the duct by the hot air blast and their moisture content may be reduced to approximately 4% in passing through 200 feet of tunnel. The time of the final drying step may be hastened if means are provided to reheat the gas as it passes through the duct. The dried product reaches the cyclone separator 63 where it is separated from the gas current and delivered to a vertical duct 64 through which it passes downwardly toward the packaging station. Dehydrated vegetables packaged at elevated temperature deteriorate rapidly and I therefore cool the potato granules by dropping them through a gentle current of cold air after they leave the cyclone separator 63. The air used for this final cooling step may be artificially refrigerated, dehydrated and recirculated, or it may be naturally cold air if that is available outside the plant.

By the term "dancing" as used herein I mean that the product is kept in a continuous state of motion by being thrown or bounced upwardly by the vibrating conveyor belt. The individual pieces making up the product layer are thus maintained separated from each other and bathed in the current of air or gas to which they are subjected in the various steps of the process.

While I have described the process of my invention as it is carried out in the preparation of dehydrated cooked potatoes, it has a broader application and many other vegetables, cereals and other food units such as carrot or squash granules, peas, beans, onion rings, corn grits, etc. may be advantageously treated within the scope of my invention. I have further found that the process of my invention may be advantageously utilized in the dehydration of granular synthetic rubber and certain other non-food products in the form of small discrete units.

Having thus disclosed my invention and described in detail a preferred manner of carrying it out, I claim as new and desire to secure by Letters Patent:

1. A process of producing dehydrated cooked potato in granular form capable of being rehydrated into mashed potato, which comprises the steps of first cutting raw potatoes into pieces and then continuously dancing the pieces above a movable surface to keep them from adhering together and to render the mass readily permeable by gaseous currents, and while thus dancing the pieces subjecting them progressively to dehydration to about 75% of their initial content, to cooking of the partially dehydrated pieces, and to further dehydration of the cooked pieces to 20% to 65% of their initial moisture content, subsequently extruding the pieces while maintaining the starch cells substantially intact, and finally dehydrating the extruded product to approximately 4% of the initial content of the raw potatoes.

2. The process of producing dehydrated cooked potato in granular form capable of being rehydrated into mashed potato, which comprises the steps of dehydrating cut raw potato to a moisture content of about 75% of its initial content, cooking the partially dehydrated potato, further dehydrating the cooked potato to 20% to 65% of its initial moisture content, freezing the partially dehydrated and cooked potato, thawing the resulting product, extruding it while maintaining the starch cells substantially intact, and finally dehydrating to approximately 4% of its initial moisture content.

3. In a process of producing a dehydrated starchy vegetable product, the steps of cutting the vegetable into pieces, removing from the pieces at least 10% of their original moisture content, and thereafter cooking the partially dehydrated pieces.

4. In a process for producing dehydrated vegetable units, the steps of removing from the units at least 10% of their original moisture content, cooking, and thereafter removing a further definite amount of moisture, approximately 25% to 35% of the original moisture content.

5. In a process for producing dehydrated pieces of starchy vegetables, the steps of blanching the pieces to inactivate at least part of their enzyme content, removing at least 10% of the original moisture from the pieces, and thereafter cooking said pieces.

6. In a process for producing dehydrated pieces of starchy vegetables, the steps of treating the pieces of vegetables with an antioxidant, such as sodium bisulfite, to inhibit enzyme action, removing at least 10% of the original moisture from the pieces, and thereafter cooking the pieces.

7. In a process for producing dehydrated pieces of starchy vegetables, the steps of removing at least 10% of the original moisture from the pieces and thereafter successively cooking, freezing and thawing the pieces.

8. In a process for producing dehydrated pieces of starchy vegetables, the steps of removing between 10% and 45% of the original moisture therefrom and then successively cooking, removing a definite amount of additional moisture, approximately 25% to 35% of the original moisture content, thereafter freezing, and then thawing the pieces.

9. In a process for producing dehydrated vegetable units, the steps of removing 10% to 45% of the original moisture from the units, thereafter cooking the units, and then freezing, thawing, and further dehydrating the units in the stated sequence.

10. In a process of producing dehydrated vegetable units, the consecutive steps of partially dehydrating, thereafter cooking, further dehydrating, freezing, thawing, and again dehydrating.

11. In a process of producing dehydrated pieces of starchy vegetables, the consecutive steps of partially dehydrating, thereafter cooking, freezing, thawing, and ricing the pieces while preserving the starch grains in unbroken condition.

12. In a process of producing dehydrated vegetable units, the consecutive steps of partially dehydrating, thereafter cooking, freezing, thawing, ricing, and further dehydrating, all of said steps being carried out while the said units are maintained separated from each other in dancing condition.

13. In a process of producing dehydrated vegetable units, the consecutive steps of partially dehydrating, thereafter cooking, further dehydrating, freezing, thawing, extruding while preserving the starch grains in unbroken condition, and then further dehydrating.

14. In a process of producing dehydrated pieces of starchy vegetables, the consecutive steps of partially dehydrating, thereafter cooking, further partially dehydrating, freezing, thawing, repeatedly ricing, and dehydrating to final moisture content.

15. In a continuous dehydration process, the step of advancing units of a vegetable product to be dehydrated along a substantially horizontal path through a heat transfer zone while continuously moving the units in a plane substantially different from the direction of their advance through said zone.

16. In a process for dehydrating units of vegetables, the steps of advancing units of vegetable product horizontally through treating areas while supplying heat to the units by both convection and radiation, and continuously moving the pieces in a plane substantially perpendicular to the direction of their horizontal advance.

17. In a continuous process for drying vegetables, the steps of advancing the vegetables through a dehydrating zone and at the same time moving them in a plane substantially perpendicular to the direction of their advance through said zone, and simultaneously subjecting the vegetables to a current of dehydrating gas flowing in a plane substantially parallel to that of the perpendicular motion of the vegetables.

18. In a dehydration process, the steps of repeatedly impinging and dancing the units of a vegetable product to be dried on a moving surface while bathing said units in a current of dehydrating gas flowing upwardly through the moving units.

19. In a process of dehydrating pieces of starchy vegetables, the steps of removing 10-45% of the original moisture content of the pieces, hydrating their starch content by cooking the vegetable pieces, removing further moisture from the pieces, and thereafter extruding them while maintaining substantially all the starch grains in unbroken condition.

20. In a process for dehydrating pieces of starchy vegetables, the steps of removing from 10% to 45% of the original moisture content of the pieces, hydrating their starch content by cooking the vegetable pieces, removing a further 10% to 45% of the initial moisture content of the pieces, the moisture removed in both the said drying steps totaling between 50% and 80% of the initial moisture content of the pieces, extruding the partially dried pieces and further reducing the moisture content of the product.

21. In a process for heat treating vegetable units, the steps of causing said vegetable units to advance and to impinge continuously on a moving surface while removing moisture from the units.

22. A dehydration process characterized by the steps of heating pieces of starchy vegetables at least partially to inactivate their peroxidase content while said pieces are advanced and repeatedly impinged on a moving surface, and thereafter removing moisture from the pieces.

23. In a process for dehydrating vegetable units, the step of thawing frozen units while recirculating air at a temperature of about 200° F. through the mass of units without appreciably changing the weight of the individual units, the units acting as a desiccant and establishing a state of equilibrium between the frozen units and the recirculated air.

24. The process of preparing dried white potato in granular form, comprising the steps of first partially dehydrating and then cooking the potato in pieces of predetermined size, thereafter extruding the cooked pieces to form shreds without rupturing the starch grains, then dehydrating the shreds to about 20% moisture content and breaking the shreds by gentle crushing without grinding to form discrete granules.

25. In a process for dehydrating vegetables in pieces of predetermined size and shape, the steps of partially removing moisture content while agitating the pieces, thereafter cooking the pieces, and then freezing the pieces, all of said steps being carried out while the pieces are danced in a vaporous atmosphere and thus prevented from sticking together.

26. In a process for dehydrating white potatoes in pieces of predetermined size and shape, the steps of partially removing moisture content and then freezing, meanwhile maintaining the pieces in a dancing condition and thus preventing the pieces from sticking together.

27. In a process for dehydrating white potatoes in pieces of predetermined size and shape, the steps of partially removing water from the pieces by dancing them in a current of dehydrating gas, and then freezing.

CLARENCE BIRDSEYE.

REFERENCES CITED

The following references are of record in the file of this patent:

UNITED STATES PATENTS

| Number | Name | Date |
|---|---|---|
| 1,998,384 | Petitpas | Apr. 16, 1935 |
| 2,185,451 | Webb | Jan. 2, 1940 |
| 2,278,472 | Musher | Apr. 7, 1942 |
| 2,292,447 | Irwin | Aug. 11, 1942 |
| 2,333,850 | Dunkley | Nov. 9, 1943 |
| 2,365,890 | McBean | Dec. 26, 1944 |
| 2,381,838 | Rendle | Aug. 7, 1945 |